(12) United States Patent
Tanaka et al.

(10) Patent No.: US 7,289,236 B2
(45) Date of Patent: Oct. 30, 2007

(54) APPARATUS, PROGRAM, AND METHOD FOR MANAGING DUPLICATE IMAGES BASED ON THE IMAGE PROPERTIES

(75) Inventors: Hiroshi Tanaka, Asaka (JP); Mikio Watanabe, Asaka (JP); Hisayoshi Tsubaki, Asaka (JP)

(73) Assignee: Fujifilm Corporation, Tokyo (JP)

( * ) Notice: Subject to any disclaimer, the term of this patent is extended or adjusted under 35 U.S.C. 154(b) by 974 days.

(21) Appl. No.: 10/223,654

(22) Filed: Aug. 20, 2002

(65) Prior Publication Data

US 2003/0053091 A1 Mar. 20, 2003

(30) Foreign Application Priority Data

Aug. 20, 2001 (JP) ............................. 2001-248861

(51) Int. Cl.
G06F 3/12 (2006.01)
G06F 15/00 (2006.01)
(52) U.S. Cl. ...................................... 358/1.15; 358/1.9
(58) Field of Classification Search ............ 348/211.3, 348/552; 358/1.9, 1.15, 1.18, 1.19, 1.1, 500, 358/400; 709/203, 228, 231, 232; 710/19, 710/33, 46
See application file for complete search history.

(56) References Cited

U.S. PATENT DOCUMENTS

| 5,889,885 A * | 3/1999 | Moed et al. ................. 382/172 |
| 5,949,551 A | 9/1999 | Miller et al. |
| 6,930,709 B1 * | 8/2005 | Creamer et al. ......... 348/211.3 |
| 2002/0016818 A1 * | 2/2002 | Kirani et al. ............... 709/203 |
| 2002/0099829 A1 * | 7/2002 | Richards et al. ............ 709/227 |
| 2002/0169801 A1 * | 11/2002 | Barnes et al. ................ 707/513 |
| 2003/0072486 A1 * | 4/2003 | Loui et al. ................... 382/175 |

FOREIGN PATENT DOCUMENTS

| EP | 0 902 589 A2 | 3/1999 |
| JP | 10-177646 A | 6/1998 |
| JP | 11-234615 | 8/1999 |
| JP | 2000-13732 A | 1/2000 |
| JP | 2000-112799 A | 4/2000 |
| JP | 2001-69296 A | 3/2001 |

\* cited by examiner

*Primary Examiner*—Douglas Q. Tran
(74) *Attorney, Agent, or Firm*—Birch, Stewart, Kolasch & Birch, LLP

(57) ABSTRACT

The image management apparatus, image management program, and image management method are provided for obtaining image and sending it to a communication device or recording it in a recording medium if the image to be obtained has a larger amount of information than a prerecorded image and is closer to the original image. There are provided a recording device for associating and recording an image with the identification and image properties of the image, a sending and receiving device for obtaining an image, the identification and image properties of the image from a communication apparatus through a communication device, an information processing device for reading image properties stored in the recording device based on the identification of the image obtained by the sending and receiving device and comparing them with the obtained image properties, and a sending and receiving device for outputting the obtained image to the communication apparatus if the comparison by the information processing device shows that the obtained image properties have a larger amount of information than that of the recorded image properties.

9 Claims, 9 Drawing Sheets

APPARATUS, PROGRAM, AND METHOD FOR MANAGING DUPLICATE IMAGES BASED ON THE IMAGE PROPERTIES

BACKGROUND OF THE INVENTION

1. Field of the Invention

The present invention relates to an apparatus, program, and method for managing images and, in particular, to an image management apparatus, program, and method that obtain an image to record or output it.

2. Description of the Related Art

Japanese Patent Application Publication No. 11-234615 describes an image recording system that when an image data file is transferred from a first recording medium to a second recording medium, a code unique to the file to be transferred is compared with a code unique to a file recorded on the second recording medium to determine whether they are identical and, if the determination shows that they are identical, skips the transfer of the file to be transferred.

Japanese Patent Application No. 2000-040590 (which was, at the time the present invention was made, not published and not publically known) corresponding to U.S. patent application Ser. No. 09/784,159 describes an image information obtaining method, image information sending apparatus, and image information transmission system in which an image information sending party generates directory for individual parameters for storing a plurality of images categorized by parameter indicating the characteristic of the images and registers required file names and an image information receiving party selects a desired image file having a desired parameter based on information about the generated directories to receive the desired image file from the image information sending party.

The prior-art image recording system described in Japanese Patent Application Publication No. 11-234615 assigns a different ID to an image when a manipulation such as an edit is made to the image. This system may be useful for a simple transmission system between a digital camera and a recording medium, for example as indicated in the publication. However, when an image is sending and receiving between devices such as a mobile phone and a PDA (Personal Data Assistance), which will become widespread, problems will occur as follows.

Typical devices such as mobile phones and PDAs often support images of different sizes (the number of pixels or color gradation levels) because of functional limits of their display. For example, if the number of pixels of an image shot by an electronic camera is 1280×960, the gradation level for each pixel is 24 bits and the image is transferred to a mobile phone capable of displaying 160×120-pixel, 8-bit-gradation-level images, resizing must be performed to reduce the number of pixels and gradation levels to the number supported by the display ability of the mobile phone before sending the image.

If an electronic camera sends an image that can display images with 320×240 pixels and 16 bits of gradation, the image must be resized to reduce the number of pixels and gradation levels to the number supported by the display ability of the PDA before sending the image. If images resized in this way through a number of devices to sizes readily treated by the devices accumulate in an image management apparatus (such as a personal computer) of a user, there would be a large number of duplicated images of the same scene (the same original image) that have different image properties (the number of pixels, gradation levels, compression rates, image formats, and other properties). In an image management apparatus in which an original image and a large number of its duplicated images are accumulated, it inconveniently takes extra efforts for a user to search for a desired image.

The prior-art image recording system disclosed in Japanese Patent Application Publication No. 11-234615 assigns different unique IDs to an original image and its individual duplicated images. Consequently, when images obtained from various devices such as an electronic camera, mobile phone, and PDA are stored in an image management apparatus such as a personal computer (PC), a number of duplicated images of the same scene are accumulated, resulting in a highly redundant recording state. When the user browses a list of stored images, the similar duplicated images appear one after another, thereby posing the problem that they become difficult to manage images and organization of them become cumbersome.

In other words, the system cannot address a case where there are a plurality of paths over which images are provided and their scene is not changed (the images are perceived as the same image by the user) in the course of the provision but in fact they undergo some image processing.

The invention described in Japanese Patent Application No. 2000-040590 also cannot resolve the above-described problem.

SUMMARY OF THE INVENTION

The present invention has been made in view of these circumstances and an object of the present invention is to provide an image management apparatus, image management program, and image management method that can manage images without changing image identifying information assigned to the images even if a conversion process is applied to them.

Another object of the present invention is to provide an image management apparatus, image management program, and image management method that can obtain an image and transmit it to a communication device or record it on a recording medium if the amount of information in the image obtained is greater than that of an image recorded in the image management apparatus and the image obtained is close to its original image.

To achieve the these objects, the present invention is directed to an image management apparatus which obtains an image from a communication apparatus through a communication device or from a recording medium and outputs the image to another communication apparatus through a communication device or to a recording medium, the image management apparatus comprising: a recording device which associates and records an image with an identification of the image and an image property of the image, such as information on a number of pixels, a compression rate of the image, information indicating whether the image is compressed or not, an amount of information contained in the image after RGB or YCC sampling is applied to the image or an amount of image data; an obtaining device which obtains the image and the identification and the image property of the image from the communication apparatus through the communication device or the recording medium; a comparison device which reads the image property recorded in the recording device based on the identification of the image obtained by the obtaining device to compare the read image property with the obtained property; and an output device which outputs the obtained image to a communication apparatus through the communication device or to a recording medium if it is determined as a result of the comparison by the comparison device that the obtained image property indicates a larger number of pixels, a lower compression rate, a non-compressed image, a larger amount of sampled information, or a larger amount of image data.

According to the present invention, there are provided a recording device for associating and recording an image with the identification of the image and image property, an obtaining device for obtaining the image and the identification of the image and image property from a communication apparatus over a communication device or from a recording device, a comparison device for reading an image property recorded in the recording device based on the identification of the image obtained by the obtaining device and comparing them with the obtained image property, and an output device for outputting the obtained image to a communication apparatus over a communication device or to a recording device if it is determined as a result of the comparison by the comparison device that the obtained image property provides a larger amount of information. Thus, if the amount of information in the image being obtained is larger than that of the recorded image and closer to its original image, the image is obtained to send it to the communication apparatus or record it on a recording medium.

To achieve the above-described object, the present invention is directed to an image management apparatus which obtains an image from a communication apparatus through a communication device or from a recording medium and outputs the image to another communication apparatus through a communication device or to a recording medium, the image management apparatus comprising: an obtaining device which obtains an image and an identification of the image from a communication apparatus through a communication device or from the recording medium; an image conversion device which applies, to the obtained image, image conversion such as pixel count change, compression rate change, image compression, image sampling criterion change such as RGB or YCC, or aspect ratio change; an identification assigning device which retains the identification of the image obtained by the obtaining device and assigns the identification to the converted image after the image conversion is applied to the image; and an output device which outputs the image converted by the image conversion device and the identification of the image assigned to the image by the identification assigning device to a communication apparatus through the communication device or to a recording medium.

According to another aspect of the present invention, the image management apparatus comprises an obtaining device for obtaining an image and the identification of an image from a communication apparatus over a communication device or from a recording device, an image conversion device for applying image conversion to the obtained image, an identification assigning device for retaining the identification of the image obtained by the obtaining device and assigning it to the converted image after the image conversion is applied to the image, and an output device for outputting the image converted by the image conversion device and the identification assigned to the image by the identification assigning device to a communication apparatus over a communication device or to a recording device. Thus, images can be managed without changing the identifications assigned to the images even if they are converted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of an image management apparatus, program, and method according to the present invention will be described below with reference to the accompanying drawings.

Figure 1:
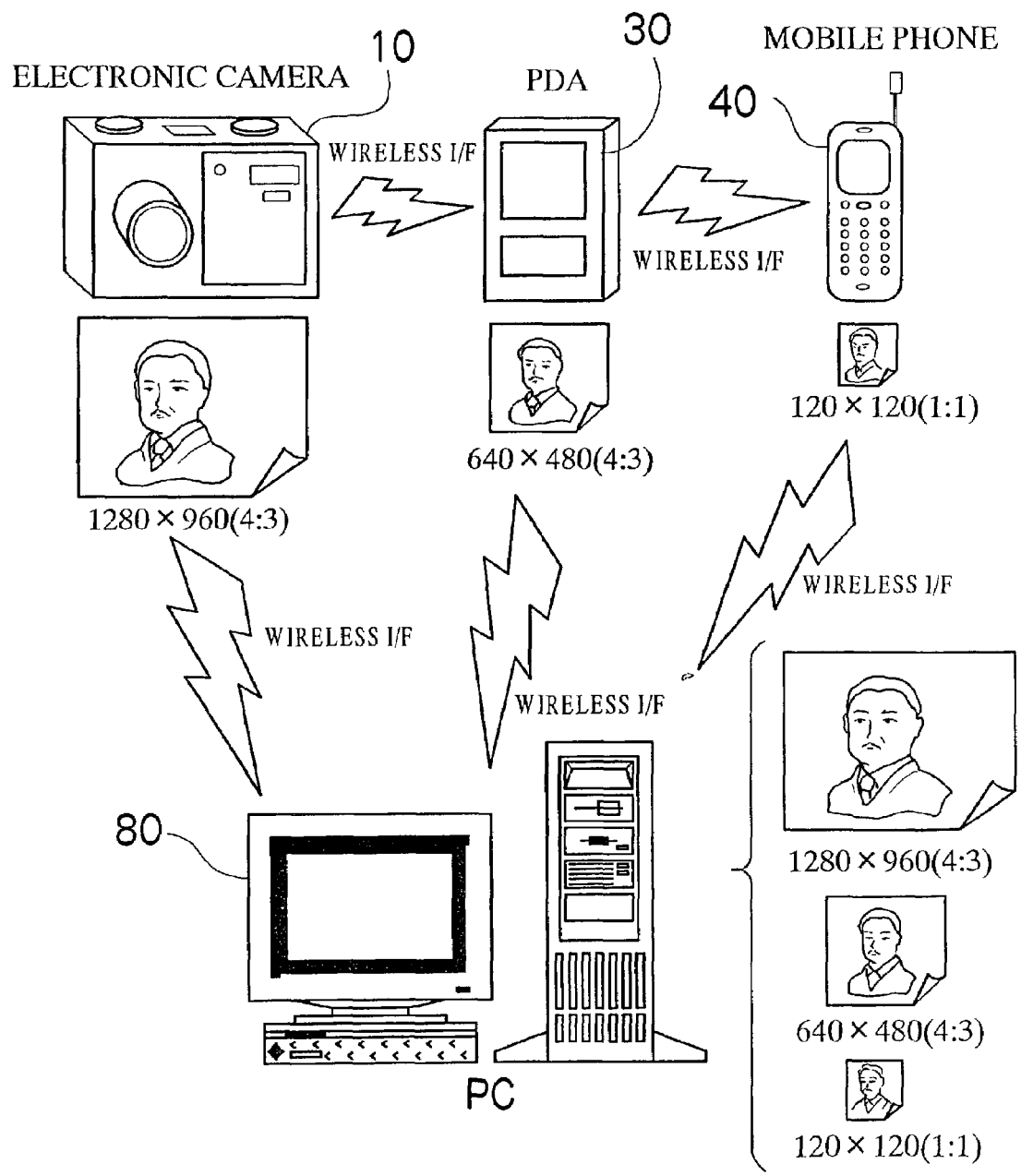
FIG. 1 shows an exemplary configuration of an image management system.

FIG. 1 shows an exemplary configuration of an image management system.

As shown in FIG. 1, the image management system comprises an electronic camera 10 (including functionality of an image management apparatus) for shooting a subject image and assigning a unique identification to the shot image, a PDA 30 (including functionality of the image management apparatus) capable of sending and receiving images to and from electronic device (communication apparatuses) such as the electronic camera 10, personal computer 80, or a mobile phone 40, a mobile phone 40 (including functionality of the image management apparatus) capable of sending and receiving images to and from electronic devices (communication apparatuses) such as the electronic camera 10, PDA 30, or personal computer 80, a personal computer 80 (including functionality of the image management apparatus) in which a user ultimately stores images.

Any of the electronic devices (communication apparatuses) such as the electronic camera 10, PDA 30, mobile phone 40, and personal computer 80 can obtain images through wired or wireless communications or a recording medium, display them on a display device, and record them on a recording device, and/or otherwise treat them.

For the purpose of illustration, an example is used in which the electronic devices can accommodate the numbers of pixels and compression technology as shown in Table 1.

TABLE 1

| Communication apparatus | Number of pixels of shot image | Supported number of pixels | Supported compression technology |
| --- | --- | --- | --- |
| Electronic camera | 1280 × 960 | 80 × 60 to 1280 × 960 | JPEG |

TABLE 1-continued

| Communication apparatus | Number of pixels of shot image | Supported number of pixels | Supported compression technology |
|---|---|---|---|
| PDA | — | 80 × 60 to 640 × 480 | JPEG |
| Mobile phone | — | 120 × 120 | JPEG |
| PC | — | Unlimited | JPEG |

As shown in the Table, when an image is sent from the electronic camera 10 to the PC 80, no resizing is required in which the number of pixels is changed. On the other hand, when an image is sent from the electronic camera 10 to an electronic device (communication apparatus) such as the PDA 30 or the mobile phone 40, the sending electronic camera 10, or the receiving PDA 30 or mobile phone 40 must perform resizing for changing the number of pixels to the number of pixels supported by the receiving PDA 30 or mobile phone 40 because the number of pixels supported by the receiving electronic devices is limited.

For example, when an image of 1280×960 pixels (3:4 in aspect ratio) shot by the electronic camera 10 is sent to the PDA 30, resizing is applied to the image in which the image is automatically converted to reduce the number of pixels from 1280×960 to 640×480 supported by the PDA 30 before sending. Also, when an image shot by the electronic camera 10 is sent to the mobile phone 40, the image is automatically resized for reducing the number of pixels from 1280×960 to 120×120 supported by the mobile phone 40 and the right and left edges of the image are trimmed before sending.

When an image is sent from the PDA 30 to the electronic camera 10 and the PC 80, the image is not required to be resized. On the other hand, when the image is sent from the PDA 30 to the mobile phone 40, resizing is performed in which the image is automatically converted for reducing 640×480 pixels treated by the PDA 30 to 120×120 pixels supported by the mobile phone 40 and the right and left edges of the image are trimmed before sending.

When an image is sent from the mobile phone 40 to the electronic camera 10, PC 80, or PDA 30, the image to be sent is not required to be converted. The image of 120×120 pixels treated by the mobile phone 40 can be sent without change.

Consequently, images resulting from image processing such as resizing applied to the same original image (image of the same scene) may be sent from the electronic camera 10, PDA 30, and mobile phone 40, for example, to the PC 80 and stored in the PC 80. According to the prior art, three image files are stored in the PC 80, causing complexity of the management of the images by the user. Essentially, it is not required that the three images be stored in the PC 80. One image of 1280×960 obtained from the electronic camera 10 suffices.

According to the present invention, an image, its identification, and image properties are associated with one another and recorded in a recording device. The image properties recorded in the recording device are read based on the identification of the image that is obtained through an obtaining device and the read image properties are compared with received image properties. If as a result of the comparison the received image properties indicate a greater number of pixels, a lower compression rate, a non-compressed image, a greater amount of sampled information, or a greater amount of image data than the recorded image properties, the obtained image is provided to another communication apparatus through a communication device or to a recording device. Consequently, one of an original image and a plurality of images converted from the same original image can be stored.

According to the present invention, image and its identification are obtained through an obtaining device and an image conversion process such as a process for changing the number of pixels is applied to the obtained image. An identification assigning device maintains the identification of the image and assigns the same identification to the converted image and outputs the image and identification through an output device. Thus, the image can be managed without changing the identification assigned to the image after the conversion process.

Figure 2:
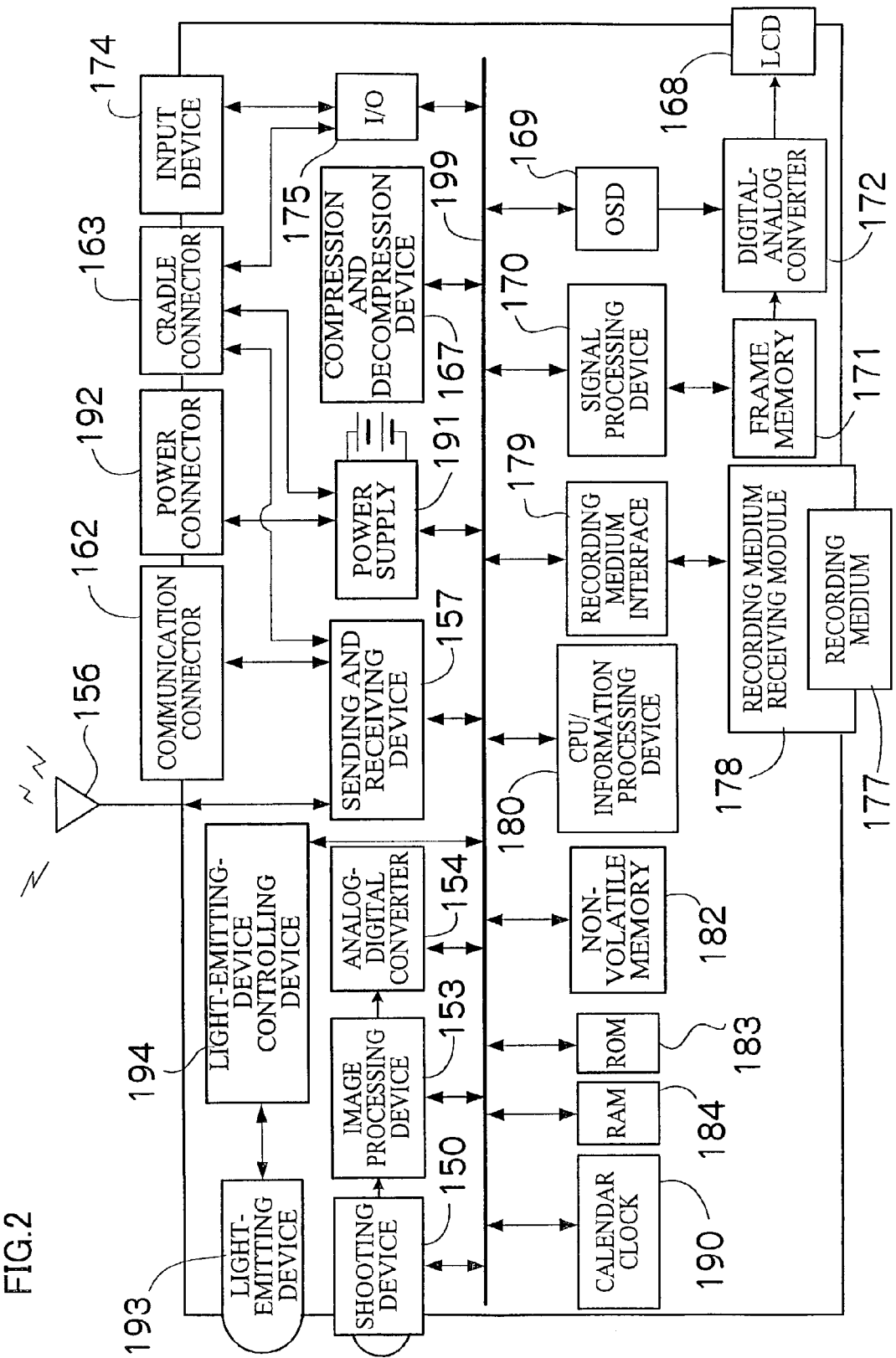
FIG. 2 shows a block diagram of signal processing system in an electronic camera.

FIG. 2 shows a block diagram of a signal processing system of the electronic camera.

The image processing module of the electronic camera 10, which is one embodiment of the image management apparatus having an image shooting device, includes an image shooting device 150 for forming the image of a subject on a photoreceptor surface and photoelectric-converting the image of a subject to output it as an image signal, an image processing device 153 (including functionality of an image converter) for performing processes such as image resizing, sharpness correction, contour processing, and contrast correction, and an analog-digital converter 154 for converting an analog image signal into digital image data.

The communication device of the electronic camera 10, which sends and receive information such as image data to and from another communication apparatus, comprises a short-distance sending and receiving device 157 (including functionality of an obtaining device and output device) for sending and receiving information such as image data using a carrier wave such as a radio wave, and an antenna 156 for sending and receiving a carrier wave and information such as image data, a communication connector 162 for sending and receiving information such as image data to and from another communication apparatus over a communication cable, and a cradle connector 163 for sending and receiving information to and from another communication apparatus through a cradle to which the electronic camera 10 is attached.

The electronic camera 10 also includes a compression and decompression device 167 (including functionality of an image converter) for applying a compressing or pixel skipping process to information such as image data and decompressing a compressed image data with a technique represented by JPEG or motion JPEG, an OSD 169 for displaying text and message data along with an image on the screen of a display device 168, a signal processing device 170 (including functionality of an image converter) for applying white balancing, gamma conversion, YC conversion, pixel count conversion, electronic zooming, trimming and other processes to image data obtained through shooting, a frame memory 171 for temporarily storing image data to be displayed, and a digital-analog converter 172 for converting digital image data into a composite signal for displaying.

The electronic camera 10 also comprises an input device 174 including a power switch, release button, communication button, send button, function switches, a cross button, confirmation switch, and mode selection switch, an I/O interface 175 for inputting and outputting information inputted by the input device 174 and information to be displayed at a display device such as an LED, a recording medium receiving module 178 in which a recording medium 177 (including functionality of a recording device) is removably mounted, a recording medium interface 179 (including functionally of an obtaining device and output device) for recording and reading information such as image data to and from the recording medium 177. The recording medium 177 may be a semiconductor device such as a memory card, removal recording medium, including a magnetic or optical recording medium such as MO.

The electronic camera 10 also includes an information processing device 180 (including functionality of a comparison device, an image converter and identification assigning device) for performing an entire control of the electronic camera 10 as well as image data sampling timing control, image data recording control, image data graphics recognition, a process for reading information about the model of the electronic camera 10 and information unique to electronic devices, communication control, image and audio recording control, display control, and other processes, a nonvolatile memory 182 (which may include functionality of a recording device) on which information can be rewritten and which does not lose recorded information such as adjustment constants when power is removed from it, a ROM 183 storing a unique identification such as the manufacturer name, model, and serial number of the electronic camera 10, operating programs, constants, and information about display, and a RAM 184, which is a storage device that can be fast read and written and is used as a working area during the execution of a program.

The electronic camera 10 also comprises a calendar clock 190 for keeping time, a power supply 191 for supplying power for driving the electronic camera 10, a power connector 192 for receiving power supplied from an external power source, a light-emitting device 193 for emitting light toward a subject to supplement the amount of light during shooting, and a light-emitting-device controlling device 194 for controlling the timing of light emission and the amount of light emitted by the light emitting device 193.

The information processing device 180 of the electronic camera 10 and each circuit around it are connected through a bus 199 and can communicate information with one each other at high speed.

A shooting process by the electronic camera 10 configured as described above will be described below.

A shot image is formed on the photoreceptor surface of the shooting device 150 by an imaging lens provided in the electronic camera 10. The formed image is photoelectric-converted and provided to the image processing device 153. The image processing device 153 applies image processes such as correlation double sampling, amplification, noise reduction to the resulting image signal and the analog-digital converter 154 converts it into digital data.

The image data converted into the digital data is transferred to the signal processing device 170 in response to a direction from the information processing device 180 and undergoes image processing such as image white balancing, gamma correction, YC conversion, zooming, and pixel count conversion, then temporarily stored in the frame memory 171 such as VRAM.

The information processing device 180 provides an instruction for sequentially transmitting the image data stored in the frame memory 171 to the digital-analog converter 172 and the image data is displayed on the display device 168 together with information such as characters generated by the OSD 169.

When the user presses a release button provided in the input device 174 for providing an instruction for shooting, the information processing device 180 enters a mode for shooting a subject. Then, the information processing device 180 records in the RAM 184 image data having 12-bit gradation, for example, for each of RGB primary colors, which is digital data converted by the analog-digital converter 154.

If the image is recorded onto a recording medium 177, the image stored in the RAM 184 is sequentially read and transferred to the signal processing device 170. Then, image processing such as image white balancing, gamma correction, YC correction, zooming, and pixel count conversion is applied to the image to convert the gradation of each color and the size of the image, then transferred to the compression and decompression device 167.

The image data compressed by the compression and decompression device 167 according to predetermined requirements is temporarily stored in a file work area of the RAM 184 again according to an instruction from the information processing device 180. Then, it is converted into image data for recording and provided to the recording medium interface 179 and sequentially recorded onto the recording medium 177. The information processing device 180 also generates the identification that is unique to the shot image according to a predetermined algorithm and records it in the recording medium 177 along with the image.

While the embodiment in which the image management apparatus is an electronic camera including a shooting device has been described, the present invention is not limited to this. The object of the present invention can be also achieved by an image management apparatus that can obtain an image from an external device, convert and record it.

The recording medium 177 can associate and record an image with the identification of the image and image properties such as the number of pixels of the image, compression rate, whether the image is compressed or not, the amount of image data resulting from RGB or YCC sampling, and the amount of image data.

The obtaining device such as sending and receiving device 157 can obtain an image, identification unique to the image, and image properties from another communication apparatus (electronic device).

The information processing device 180 (comparison device) can read image properties recorded on the recording medium 177 based on the identification that is unique to an image obtained by an obtaining device such as the sending and receiving device 157 and compare them with the received image properties.

If as a result of comparison by the information processing device 180 (comparison device) the properties of the obtained image indicates a greater number of pixels, a lower compression rate, a non-compressed image, a greater amount of sampled information, or a greater amount of image data than the recorded properties, the information processing device 180 outputs the obtained image to another communication apparatus through an output device such as the sending and receiving device 157, or outputs it onto a recording medium 177 through an output device such as the recording medium interface 179.

When the recording medium interface 179 (output device) records an image onto the recording medium 177, it can delete an image that is associated and recorded with the identification identical to that of the image to be output on the recording medium 177.

If as a result of the comparison by the information processing device 180 (comparison device) it cannot be determined that the properties of an obtained image indicate a smaller number of pixels, a higher compression rate, a compressed image, a smaller amount of sampled information, or a smaller amount of image data than the recorded properties, the recording medium interface 179 (output device) can output the obtained image onto the recording medium 177 and leave the image associated and recorded with the same unique identification as that of the output image on the recording medium 177 without deleting the recorded image.

The obtaining device such as the sending and receiving device 157 can obtain an image and its identification from another communication apparatus.

The information converting device such as the information processing device 180 can apply image processing to an obtained image, such as pixels conversion, compression rate change, image compression, RGB or YCC image sampling requirement change, and/or aspect ratio change.

The information assigning device such as the information processing device 180 can maintain the identification of the image obtained by the obtaining device and assign it to the converted image after the image converting device performs image conversion.

The output device such as the sending and receiving device 157 can output an image converted by the image converting device and the image identification assigned to the image by the identification assigning device to another communication apparatus.

If a new image is generated by shooting a substance, combining a number of images, or trimming both the length and width of an original image, the identification assigning device such as the information processing device 180 can generate and assign a new identification to that image.

The output device, which may be the sending and receiving device 157, can outputs the generated image and the identification assigned to the image by the identification assigning device to another communication apparatus.

Figure 3:
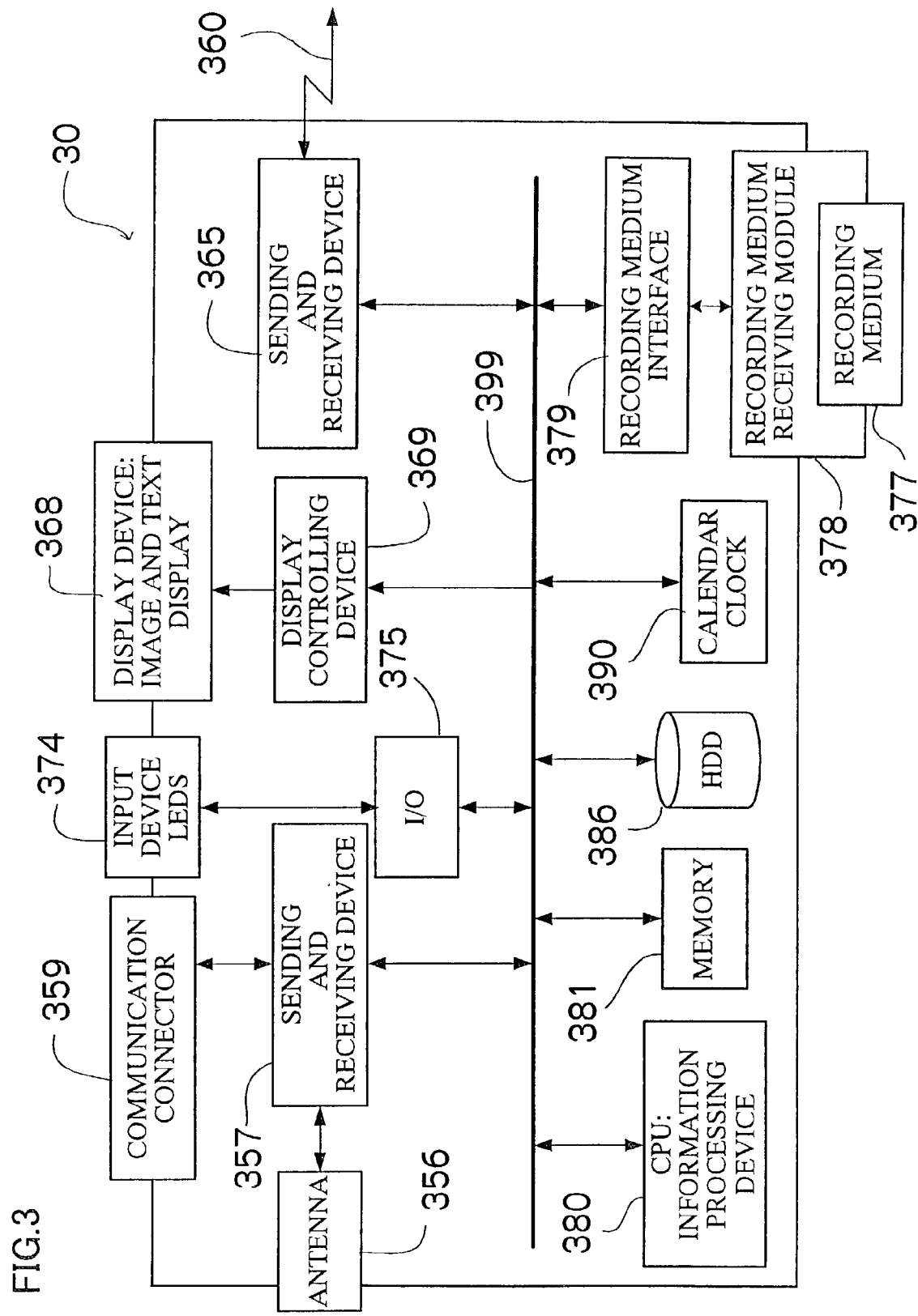
FIG. 3 shows a block diagram of a signal processing system in a PDA.

FIG. 3 shows a block diagram of a signal processing system of a PDA according to the present invention.

Referring to FIG. 3, an information sending and receiving section in the PDA 3 comprises an antenna 356 used as a short-distance wireless communication device or a long-distance wireless network communication device, a sending and receiving device 357 (including functionality of an obtaining device, output device, and communication device) that converts data into data having a predetermined format for sending and receiving wirelessly or over a cable, and a cable sending and receiving device 365 (including functionality of obtaining device, output device, and communication device) for sending and receiving information to and from another communication apparatus (such as a mobile phone 40, personal computer 80, and electronic camera 10) over a public circuit 360 or a communication network.

The PDA 30 also comprises a display device 368 for displaying information such as images and text in a resolution of 640×480, for example, a display control device 369 for providing a display image signal to a display device 368 according to an instruction from an information processing device 380, and an I/O 375 for reading information inputted by a user through an input device 374 and providing it to the information processing device 380 or providing a display instruction to an indication device such as an LED according to an instruction from the information processing device 380, which will be described later.

The PDA 30 also comprises a recording medium receiving module 378 in which a recording medium 377 (which may include functionality of a recording device) is removably mounted, and a recording medium interface 379 (including functionality of an obtaining device and output device) for recording and reading information such as image data on the recording medium 377. The recording medium 377 is a removable recording medium similar to the recording medium 177 described earlier.

The PDA 30 also comprises the information processing device (CPU) 380 (which may include functionality of a comparison device, image converting device, identification assigning device) for controlling the entire PDA 30, memory 381 including a ROM containing programs for causing the information processing device 380 to operate and constants such as the manufacturer name, model, and serial number of the PDA 30, and a RAM which is a recording device used as a working area during execution of a process by the information processing device 380, a recording device 386 such as a semiconductor device or a hard disk that can be read and written and used for recording information such as constants concerning processes performed by the PDA 30, dialup numbers, attribute information, URLs (Uniform Resource Locators), addresses, site addresses, gateway information DNS (Domain Name System) for connecting to a communication apparatus on a network, and a calendar clock 390 for keeping time.

The information processing device 380 and its peripheral circuits, including the display control device 369, I/O 375, memory 381, recording device 386, and calendar clock 390 are interconnected over a bus 399 and the information processing device 380 can control each of the peripheral circuits.

The short-distance wireless communication device uses a radio wave, ultrasonic wave, or light such as infrared as a carrier wave. If a radio wave is used, the device may be compliant with specifications for wireless communication such as wireless LAN (Local Area Network) communication.

While the example has been described in which a PDA 30 is used as a communication apparatus, it may be any communication terminal such as a mobile phone and electronic organizer that has a recording device and communication device.

The recording device 386 (or recording medium 377) can associate and record an image with the identification of the image and image properties such as information on the number of pixels, compression rate of the image, whether the image is compressed or not, the amount information resulting from RGB or YCC sampling, and the amount of image data.

The obtaining devices such as sending and receiving devices, 357 and 365, the recording medium interface 379 can obtain the image, unique identification of the image, and image properties from another communication apparatus or recording medium 377.

The information processing device 380 (comparison device) can read image properties recorded in the recording device 386 and so on based on the identification that is unique to an image obtained by the obtaining device such as the sending and receiving device 357 and compare them with the received image properties.

If as a result of the comparison by the image processing device 380 (comparison device) the properties of an obtained image indicate a greater number of pixels, a lower compression rate, a non-compressed image, a greater amount of sampled information, or a greater amount of image data, the information processing device 380 can output the obtained image to another communication apparatus through an output device such as the sending and receiving device 357 or to a recording medium 377 through an output device such as the recording medium interface 379.

When the recording medium interface 379 (output device) records an image onto the recording medium 377, it can delete an image that is associated and recorded with the identification identical to that of the image to be output on the recording medium 377.

When the information processing device 380 records an image onto the recording device 386, it can delete an image that is associated and recorded with the identification identical to that of the image to be output on the recording device 386.

If as a result of a comparison by the information processing device 380 (comparison device) it cannot be determined that the properties of an obtained image indicate a smaller number of pixels, a higher compression rate, a compressed image, a smaller amount of sampled information, or a smaller amount of image data than the recorded properties, the recording medium interface 379 (output device) can output the obtained image onto the recording medium 377 and leave the image associated and recorded with the same unique identification as that of the output image on the recording medium 377 without deleting the recorded image.

If as a result of the comparison the information processing device 380 (output device and comparison device) cannot determine that the properties of an obtained image indicate a smaller number of pixels, a higher compression rate, a compressed image, a smaller amount of sampled information, or a smaller amount of image data than the recorded properties, the information processing device 380 can output the obtained image to the recording device 386 and leave the image associated and recorded with the same unique identification as that of the output image on the recording device 386 without deleting the recorded image.

The obtaining device such as the sending and receiving device 357 can obtain an image and the identification of the image from another communication apparatus.

The obtaining device such as the recording medium interface 379 can obtain an image and the identification of the image from the recording medium 377.

The obtaining device such as the information processing device 380 can obtain an image and the identification of the image from the recording device 386.

The image converting device such as the information processing device 380 can apply image processing to an obtained image, such as pixels count conversion, compression rate change, image compression, RGB or YCC image sampling requirement change, and/or aspect ratio change.

The information assigning device such as the information processing device 380 can maintain the identification of the image obtained by the obtaining device and assign it to the converted image after the image converting device performs image conversion.

The output device such as the sending and receiving device 357 can output an image converted by the image converting device and the image identification assigned to the image by the identification assigning device to another communication apparatus.

The output device such as the recording medium interface 379 can output the image converted by the image converting device and the identification of the image assigned to the image by the identification assigning device to the recording medium 377.

The output device such as the information processing device 380 can output the image converted by the image converting device and the identification of the image assigned to the image by the identification assigning device to the recording device 386.

If a new image is generated by shooting a substance, combining a number of images, or trimming both the length and width of an original image, the identification assigning device such as the information processing device 380 can generate and assign a new identification to that image.

The output device, which may be the sending and receiving device 357, can output the generated image and the identification of the image assigned to the image by the identification assigning device to another communication apparatus.

The output device such as the recording medium interface 379 can output the generated image and the identification of the image assigned to the image by the identification assigning device to the recording medium 377.

The output device such as the information processing device 380 can output the generated image and the identification of the image assigned to the image by the identification assigning device to the recording device 386.

Figure 4:
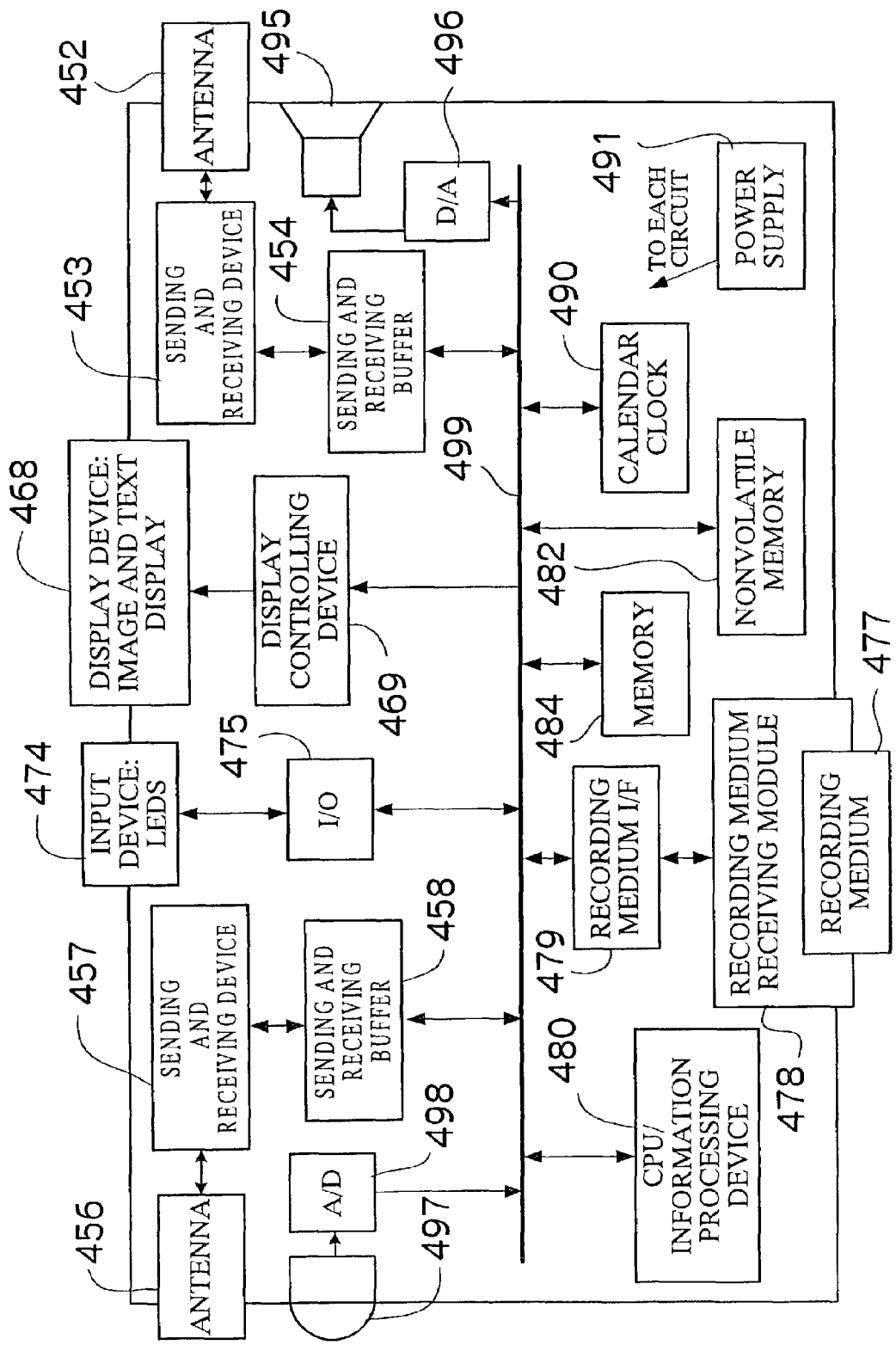
FIG. 4 shows a block diagram of a signal processing system in a mobile phone.

FIG. 4 shows a block diagram of a signal processing system of a mobile phone 40.

Referring to FIG. 4, an information sending and receiving device in the mobile phone 40 comprises an antenna 42 for wirelessly communicating with a public circuit, a sending and receiving device 353 (including functionality of an obtaining device, output device, and communication device) for the public circuit, a sending and receiving buffer 454 for temporarily storing information to be sent or received in real time, an antenna 456, a sending and receiving device 457 (including functionality of an obtaining device, output device, and communication device), and a sending and receiving buffer 458 that are used as short-distance wireless communication means.

The mobile phone 40 also comprises a display device 468 for displaying information such as images and text, a display control device 469 for outputting a display image signal to the display device 468 having a display resolution of 120× 120, for example, according to an instruction from an information processing device 480, and an I/O 475 for reading information inputted by a user through an input device 474, providing it to an information processing device 480, which will be described later, and outputting a display instruction to an indication device such as an LED according to an instruction from the information processing device 480.

The mobile phone 40 also comprises a recording medium receiving module 478 for removably mounting recording medium recording medium 477 (which may be one similar to the recording medium 177 mounted in the electronic camera 10 and may include functionality of a recording device), and a recording medium interface 479 (including functionality of an output device and obtaining device) for recording and reading information such as image data on the recording medium 477.

The mobile phone 40 also comprises the information processing device 480 (CPU, which may include functionality of a comparison device, image converting device, and identification assigning device) for controlling the entire mobile phone 40, a rewritable nonvolatile memory 482 for recording constants concerning processes performed by the mobile phone 40 and connection information such as dialup numbers, attribute information, URLs, IP addresses, gateway information DNS for connecting to communication apparatuses on a network, and a memory 484 including a ROM containing programs for causing the information processing device 480 to operate and constants such as the manufacturer name, model, and serial number of the mobile phone 40, and a RAM which is a recording device used as a working area during execution of a process by the information processing device 480, a calendar clock 490 for keeping time, and a power supply 491 for supplying power to circuits including the information processing device 480.

The mobile phone 40 also comprises a speaker 495 acting as an earpiece when a user uses the mobile phone 40 as a telephone receiver and outputting sound, a digital-analog converter 496 for converting audio data outputted by the information processing device 480 into an analog audio signal, amplifying the audio signal, and outputting it to the speaker 495, a microphone 497 for converting input voice into an audio signal, and an analog-digital converter 498 for amplifying the audio signal inputted from the microphone 497 and converting it into audio data to be sent to the information processing device 480.

The information processing device 480 and peripheral circuits, including the sending and outputting buffers 4545 and 458, display control device 469, I/O 475, recording medium interface 479, nonvolatile memory 482, memory 484, calendar clock 490, digital-analog converter 496, and analog-digital converter 498 in the mobile phone 40 are interconnected through a bus 499. The information processing device 480 controls each peripheral circuit and can send and receive information at high speed.

The short-distance wireless communication device uses a radio wave, ultrasonic wave, or light such as infrared as a carrier wave. If a radio wave is used, the device may be compliant with specifications for wireless communication such as wireless LAN (Local Area Network) communication.

While the example has been described in which a mobile phone 40 is used, it may be any communication apparatus or electronic device such as a personal computer and electronic organizer that has a recording device and communication device.

The nonvolatile memory 482 (or recording medium 477) can associate and record an image with the identification of the image and image properties such as information on the number of pixels, compression rate of the image, whether the image is compressed or not, the amount information resulting from RGB or YCC sampling, and the amount of image data.

The obtaining devices such as sending and receiving devices, 457 and 453, the recording medium interface 479 can obtain the image, unique identification of the image, and image properties from another communication apparatus device or recording medium 477.

The information processing device 480 (comparison device) can read image properties recorded in the nonvolatile memory 482 based on the identification that is unique to an image obtained by the obtaining device such as the sending and receiving device 457 and compare them with the received image properties.

If as a result of the comparison by the image processing device 480 (comparison device) the properties of an obtained image indicate a greater number of pixels, a lower compression rate, a non-compressed image, a greater amount of sampled information, or a greater amount of image data, the information processing device 480 can output the obtained image to another communication apparatus through an output device such as the sending and receiving device 457 or to a recording medium 477 through an output device such as the recording medium interface 479.

When the recording medium interface 479 (output device) records an image onto the recording medium 477, it can delete an image that is associated and recorded with the identification identical to that of the image to be output on the recording medium 477.

When the information processing device 480 records an image in the nonvolatile memory 482, it can delete an image that is associated and recorded with the identification identical to that of the image to be output on the nonvolatile memory 482.

If as a result of the comparison by the information processing device 480 (comparison device) it cannot be determined that the properties of an obtained image indicate a smaller number of pixels, a higher compression rate, a compressed image, a smaller amount of sampled information, or a smaller amount of image data than the recorded properties, the recording medium interface 479 (output device) can output the obtained image onto the recording medium 477 and leave the image associated and recorded with the same unique identification as that of the output image on the recording medium 477 without deleting the recorded image.

If as a result of the comparison the information processing device 480 (output device and comparison device) cannot determine that the properties of an obtained image indicate a smaller number of pixels, a higher compression rate, a compressed image, a smaller amount of sampled information, or a smaller amount of image data than the recorded properties, the information processing device 480 can output the obtained image to the recording device 477 and leave the image associated and recorded with the same unique identification as that of the output image on the recording device 477 without deleting the recorded image.

The obtaining device such as the sending and receiving device 457 can obtain an image and the identification of the image from another communication apparatus.

The obtaining device such as the recording medium interface 479 can obtain an image and the identification of the image from the recording medium 477.

The obtaining device such as the information processing device 480 can obtain an image and the identification of the image from the nonvolatile memory 482.

The image converting device such as the information processing device 480 can apply image processing to an obtained image, such as pixels count conversion, compression rate change, image compression, RGB or YCC image sampling requirement change, and/or aspect ratio change.

The information assigning device such as the information processing device 480 can maintain the identification of the image obtained by the obtaining device and assign it to the converted image after the image converting device performs image conversion.

The output device such as the sending and receiving device 457 can output an image converted by the image converting device and the image identification assigned to the image by the identification assigning device to another communication apparatus.

The output device such as the recording medium interface 479 can output the image converted by the image converting device and the identification of the image assigned to the image by the identification assigning device to the recording medium 477.

The output device such as the information processing device 480 can output the image converted by the image converting device and the identification of the image assigned to the image by the identification assigning device to the nonvolatile memory 482.

If a new image is generated by shooting a substance, combining a number of images, or trimming both the length and width of an original image, the identification assigning device such as the information processing device 480 can generate and assign a new identification to that image.

The output device, which may be the sending and receiving device 457, can outputs the generated image and the identification of the image assigned to the image by the identification assigning device to another communication apparatus.

The output device such as the recording medium interface 479 can output the generated image and the identification of the image assigned to the image by the identification assigning device to the recording medium 477.

The output device such as the information processing device 480 can output the generated image and the identification of the image assigned to the image by the identification assigning device to the nonvolatile memory 482.

Figure 5:
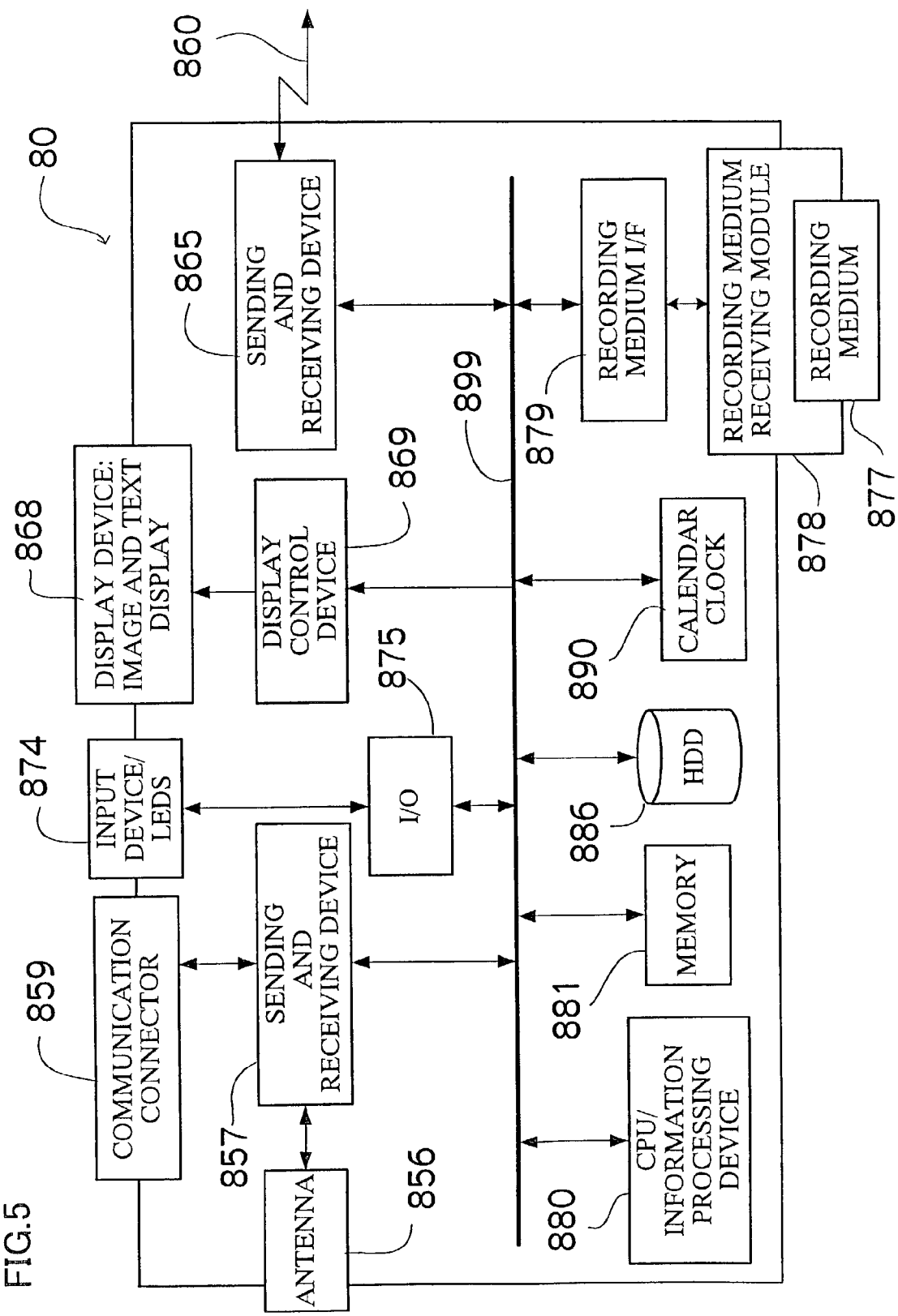
FIG. 5 shows a block diagram of a signal processing system in a personal computer.

FIG. 5 shows a block diagram of a signal processing system of a personal computer.

Referring to FIG. 5, an information sending and receiving module in the personal computer 80 comprises an antenna 856 used as short-distance wireless communication device or a long-distance wireless network communication device, a sending and receiving device 857 (including functionality of an obtaining device, output device and communication device) for converting information into data having a predetermined format for sending and receiving wirelessly or over a cable, and a sending and receiving device 865 (including functionality of an obtaining device, output device and communication device) for sending and receiving information to and from another communication apparatus (such as the electronic camera 10, PDA 30, and mobile phone 40).

The personal computer 80 also comprises a display device 868 capable of displaying information such as images and text in a resolution of 1280×960 or higher, a display control means 869 for outputting a display image signal to the display device 868 according to instructions from an information processing device 880, an I/O 875 for reading information inputted by a user through an input device 874, providing it to an information processing device 880, which will be described later, and outputting a display instruction to an indication device such as an LED according to an instruction from the information processing device 880.

The personal computer 80 also comprises a recording medium receiving module 878 for removably mounting a recording medium 877 (which may include functionality of a recording device) and a recording medium interface 870 (which may include functionality of an obtaining device and output device) for recording and reading information such as image data in the recording medium 877. The recording medium 877 is a removable recording medium similar to the recording medium 177 described earlier.

The personal computer 80 also comprises the information processing device (CPU) 880 (including functionality of a comparison device, image converting device, identification assigning device) for controlling the entire personal computer 80, memory 881 including a ROM containing programs for causing the information processing device 880 to operate and constants such as the manufacturer name, model, and serial number of the personal computer 80, and a RAM which is a recording device used as a working area during execution of a process by the information processing device 880, a recording device 886 such as a hard disk used for recording information such as constants concerning processes performed by the personal computer 80 and connection information such as dialup numbers, attribute information, URLs (Uniform Resource Locators), addresses, site addresses, gateway information DNS (Domain Name System) for connecting to a communication apparatus on a network, and a calendar clock 890 for keeping time.

The information processing device 880 and its peripheral circuits, including display control device 869, I/O 875, memory 881, recording device 886, and calendar clock 890 in the personal computer 80 are interconnected over a bus 899 and the information processing device 880 can control each of the peripheral circuits.

The short-distance wireless communication device uses a radio wave, ultrasonic wave, or light such as infrared as a carrier wave. If a radio wave is used, the device may be compliant with specifications for wireless communication such as wireless LAN communication.

While the example has been described in which a personal computer 80 is used as communication apparatus, it may be any communication terminal such as a mobile phone and electronic organizer that has a recording device and communication device.

The recording device 886 (or recording medium 877) can associate and record an image with the identification of the image and image properties such as information on the number of pixels, compression rate of the image, whether the image is compressed or not, the amount information resulting from RGB or YCC sampling, and the amount of image data.

The obtaining devices such as sending and receiving devices, 857 and 865, the recording medium interface 879 can obtain the image, unique identification of the image, and image properties from another communication apparatus or recording medium 877.

The information processing device 880 (comparison device) can read image properties recorded in the recording device 886 based on the identification that is unique to an image obtained by the obtaining device such as the sending and receiving device 857 and compare them with the received image properties.

If as a result of the comparison by the image processing device 880 (comparison device) the properties of an obtained image indicate a greater number of pixels, a lower compression rate, a non-compressed image, a greater amount of sampled information, or a greater amount of image data, the information processing device 880 can output the obtained image to another communication apparatus through an output device such as the sending and receiving device 857 or to a recording medium 877 through an output device such as the recording medium interface 879.

When the recording medium interface 879 (output device) records an image onto the recording medium 877, it can delete an image that is associated and recorded with the identification identical to that of the image to be output on the recording medium 877.

When the information processing device 880 records an image onto the recording device 886, it can delete an image that is associated and recorded with the identification identical to that of the image to be output on the recording device 886.

If as a result of the comparison by the information processing device 880 (comparison device) it cannot be determined that the properties of an obtained image indicate a smaller number of pixels, a higher compression rate, a compressed image, a smaller amount of sampled information, or a smaller amount of image data than the recorded properties, the recording medium interface 879 (output device) can output the obtained image onto the recording medium 877 and leave the image associated and recorded with the same unique identification as that of the output image on the recording medium 877 without deleting the recorded image.

If as a result of the comparison the information processing device 880 (output device and comparison device) cannot determine that the properties of an obtained image indicate a smaller number of pixels, a higher compression rate, a compressed image, a smaller amount of sampled information, or a smaller amount of image data than the recorded properties, the information processing device 880 can output the obtained image to the recording device 886 and leave the image associated and recorded with the same unique identification as that of the output image on the recording device 886 without deleting the recorded image.

The obtaining device such as the sending and receiving device 857 can obtain an image and the identification of the image from another communication apparatus.

The obtaining device such as the recording medium interface 879 can obtain an image and the identification of the image from the recording medium 877.

The obtaining device such as the information processing device 880 can obtain an image and the identification of the image from the recording device 886.

The image converting device such as the information processing device 880 can apply image processing to an obtained image, such as pixels count conversion, compression rate change, image compression, RGB or YCC image sampling requirement change, and/or aspect ratio change.

The information assigning device such as the information processing device 880 can maintain the identification of the image obtained by the obtaining device and assign it to the converted image after the image converting device performs image conversion.

The output device such as the sending and receiving device 857 can output an image converted by the image converting device and the image identification assigned to the image by the identification assigning device to another communication apparatus.

The output device such as the recording medium interface 879 can output the image converted by the image converting device and the identification of the image assigned to the image by the identification assigning device to the recording medium 877.

The output device such as the information processing device 880 can output the image converted by the image converting device and the identification of the image assigned to the image by the identification assigning device to the recording device 886.

If a new image is generated by shooting a substance, combining a number of images, or trimming both the length and width of an original image, the identification assigning device such as the information processing device 880 can generate and assign a new identification to that image.

The output device, which may be the sending and receiving device 857, can outputs the generated image and the identification of the image assigned to the image by the identification assigning device to another communication apparatus.

The output device such as the recording medium interface 879 can output the generated image and the identification of the image assigned to the image by the identification assigning device to the recording medium 877.

The output device such as the information processing device 880 can output the generated image and the identification of the image assigned to the image by the identification assigning device to the recording device 886.

Figure 6:
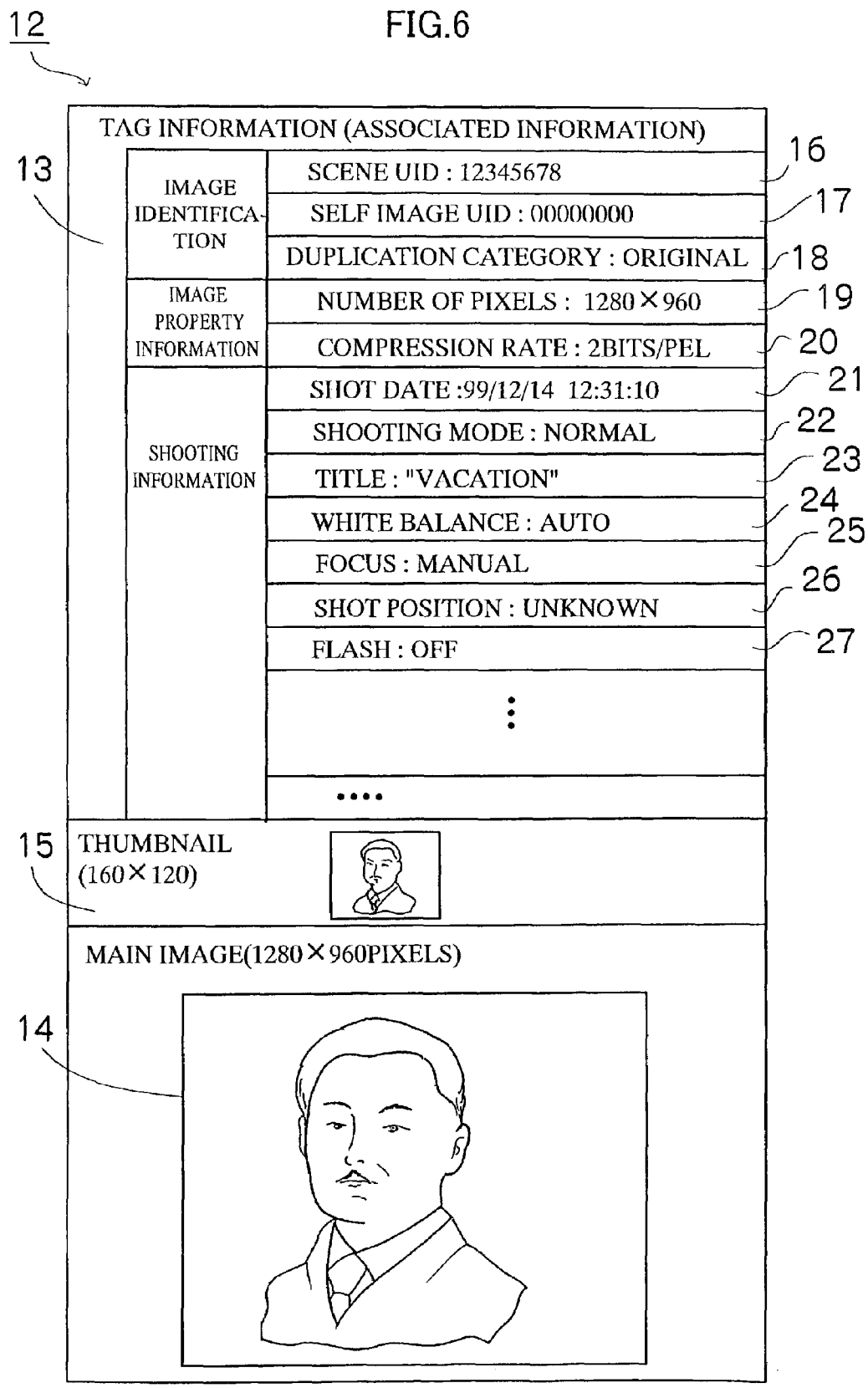
FIG. 6 shows a file structure of an image shot by an electronic camera.

FIG. 6 shows a file structure of an image shot by the electronic camera 10.

As shown in FIG. 6, an image file 12 has a section containing associated information 13 about the image, a section containing the main image 14 of that image, which has 1280×960 pixels, and a section containing a reduced image 15 (thumbnail image) of the main image 14, which is used for index display.

The section of the associated information 13 further contains original image identification 16 ("Scene UID" in FIG. 6, where UID stands for Unique Identification and a 128-bit value like "0x12345678") for identifying the image, conversion identification 17 ("Self image UID" in FIG. 6), and a duplication category 18.

The original image identification 16 and conversion identification 17 may be unique identifications computed according to a specialized numbering algorithm, for example, or may be constructed of an ID indicating the manufacturer or model of a device to be numbered, a serial number of the device, and time (the minimum unit is less than the shortest shooting or generation intervals) at which the image was shot or generated.

According to the present invention, the original image identification 16 is not changed by any of the following image conversion. Also, the original image identification 16 is not changed by any of the following image conversion performed when the original image is duplicated, edited or recorded in any device (electronic device)

A first example of image conversion by which the original image identification 16 is not changed is resolution conversion that converts an image of 1280×960 resolution into an image of 640×480 resolution.

A second example of image conversion by which the original image identification 16 is not changed is gradation conversion that converts 24-bit color or brightness gradation into 8-bit gradation.

A third example of image conversion by which the original image identification 16 is not changed is image conversion in which the right and/or left edge(s) are trimmed or the width of the image is reduced in order to transform the image having an aspect ratio of 3:4 to an image having an aspect ratio of 1:1.

A fourth example of image conversion by which the original image identification 16 is not changed is compression change conversion for reducing the compression rate (skipping rate) of an image from 70% to 30%, for example, or reducing the average amount of information (bits) per pel.

A fifth example of image conversion by which the original image identification 16 is not changed is recording format conversion in which a TIFF-compression-format image is converted into a JPEG-compression-format image.

A sixth example of image conversion by which the original image identification 16 is not changed is image format conversion in which a non-compressed image is converted into a JPEG-recording format image.

A seventh example of image conversion by which the original image identification 16 is not changed is color information conversion in which a color image is converted into a monochrome image.

An eighth example of image conversion by which the original image identification 16 is not changed is sampling information conversion in which an image is converted from RGB primary color information to brightness information and color difference information such as YCC 422 and YCC 420.

A conversion identification 17 mentioned above may also be a unique identification calculated according to a specialized numbering algorithm, or may be an ID indicating the manufacturer or model of a device to be numbered, a serial number of the device, and time (the minimum unit is less than the shortest shooting or generation intervals) at which the image was shot or generated, or may be constructed of information about image processing. A new conversion identification 17 is issued for a processed image each time image processing such as image conversion is applied to the image. In the example shown in FIG. 6, "0x00000000" is assigned.

In the duplication category field 18, information "ORIGINAL" that indicates an original image is assigned to a newly shot image as shown in FIG. 6. Information such as "COPY" is assigned to an image to which image processing such as image conversion is applied. When image processing such as image conversion is applied to an original image to produce a new image and the original image is overwritten with the new image (when the original image is deleted and the new image is recorded in place of it), information "COPY" is provided in the duplication category field 18.

The section containing the associated information 13 further contains image property information such as information 19 about the number of pixels of the main image 14 and compression information 20 represented by the average amount of information (bits) per pel of the main image 14. In addition to this image property information, information indicating whether an image is compressed or not, information about the amount of RGB or YCC sampled information and information about image data amount (the size of the image file) may be provided.

The section of the associated information 13 may contain shooting information indicating conditions under which the original image is shot or generated. Contained in the example shown in FIG. 6 are shot date and information 21 indicating date and time when the main image 14 was shot, shooting mode information 22 indicating that the image is shot in "NORMAL" shooting mode of the electronic camera 10, and the title information 23 to which the title of the main image 14 that is given by the user is assigned.

The associated information 13 section also contains white balance information 24 indicating a white balance adjusting mode set in the electronic camera 10 during shooting, focus information 25 indicting a focus mode such as "AUTO" or "MANUAL" set in the electronic camera 10 during shooting, shot position information 26 indicating the position at which the subject is shot by the electronic camera 10, and flash information 27 indicating a flash mode of fill light set in the electronic camera 10 during shooting.

Figure 7:
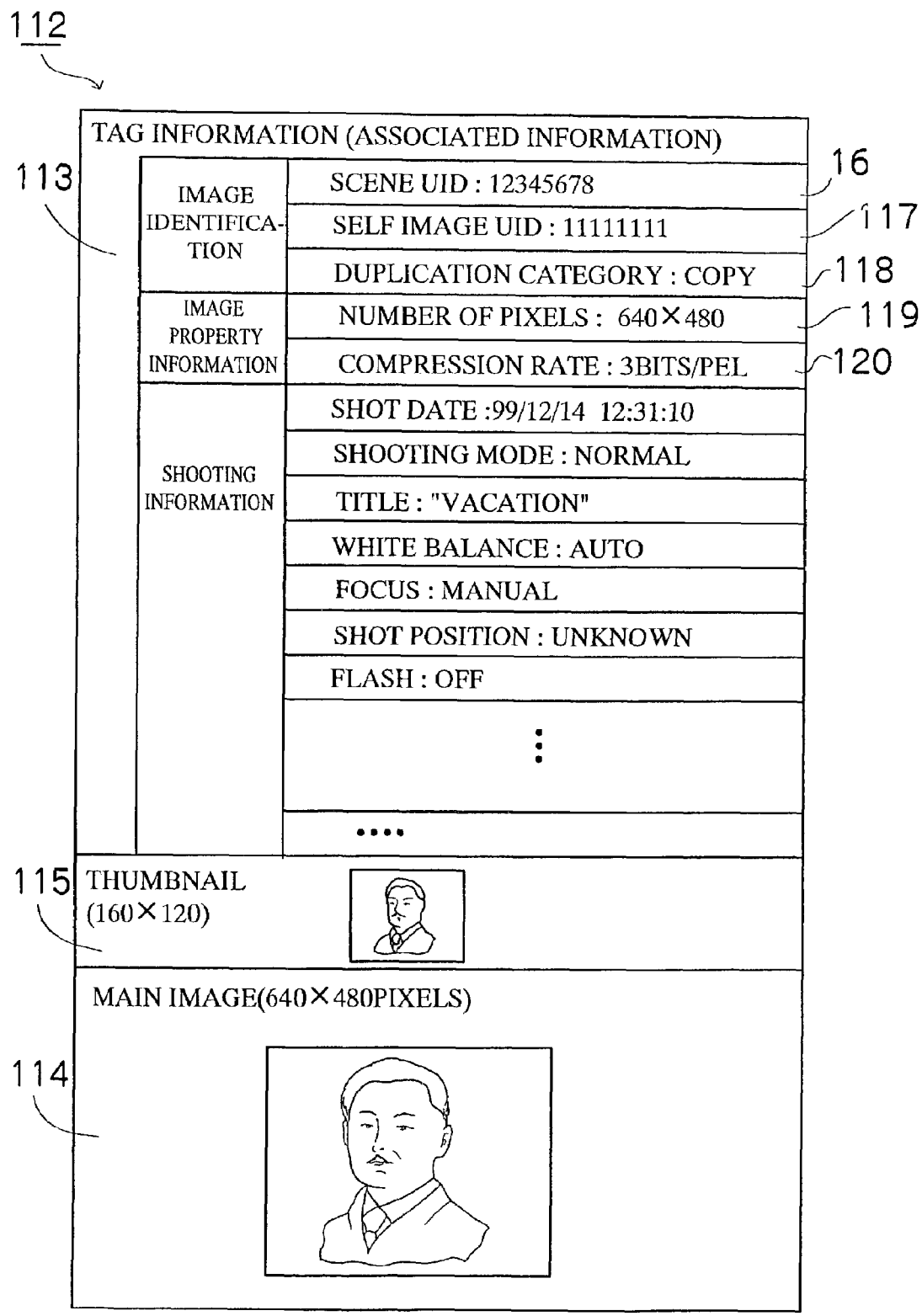
FIG. 7 shows a structure of an image file produced in an electronic camera by converting an original image for outputting to a PDA.

FIG. 7 shows a structure of an image file 112 which is produced by converting an original image in a device such as an electronic camera 10 and outputted to a PDA 30.

As shown in FIG. 7, the image file 112 has a section containing associated information 113 about an image, a section containing the main image 114 of that image, which has 640×480 pixels, and a reduced image 115 (thumbnail image) of the main image 114 for index display.

The section containing of the image file 112 which contains the associated information 113 also contains an image identification such as the identification 16 of the original image, a conversion identification 117, and a duplication category 118.

As shown in FIG. 7, an original image of 1280×960 pixels is converted in the electronic camera 10 into an image of 640×480 pixels, which are the maximum pixels supported by the PDA 30, before outputting it to the PDA 30. The original image identification 16 in the image identification to be associated with the converted main image 114 is not changed. The conversion identification 117 in the image identification is changed to a new number like "0x11111111" and assigned. In the duplication category 118 field in the image identification, "COPY" is provided for indicating that the image is a duplication of the original image that results from image conversion.

The number-of-pixels information field 119 in the image property information to be associated with the converted main image 114 contains the number of pixels, 640×480, of the converted image and the compression rate 120 of the image. No shooting information in the associated information is changed.

Figure 8:
FIG. 8 shows a structure of an image file produced in a PDA by converting an image for outputting a mobile phone.

FIG. 8 shows a structure of an image file 212 which is produced by converting an image in a device such as a PDA 30 and provided to a mobile phone 40.

The image file shown in FIG. 8 may be produced by converting an original image and provided to an electronic camera 10 and outputted to a mobile phone 40.

As shown in FIG. 8, the image file 212 has a section in which information 213 is assigned to the image and a section containing the main image 214 of that image, which has 120×120 pixels. In this example, the main image 214 has smaller number of pixels than that of a typical index image and therefore its reduced image is omitted from the image file.

The section containing the image file 212 which contains the associated information 213 also contains an image identification such as an original image identification 16, conversion identification 217, and duplication category 218.

As shown in FIG. 8, an image of 640×480 pixels is converted in an electronic device such as the PDA 30 into an image of 120×120 pixels, which are the maximum pixels supported by the mobile phone 40, before outputting it to the mobile phone 40. The aspect ratio of the image is also converted before outputting. The original image identification 16 in the image identification to be associated with the converted main image 214 is not changed and assigned. The conversion identification 117 in the image identification is changed to a new number like "0x22222222" and assigned. In the duplication category 218 field in the image identification, "COPY" is provided for indicating that the image is a duplication of the original image that results from image conversion.

The number-of-pixels information 219 in the image property information to be associated with the converted main image 214 contains the number of pixels, 120×120, of the converted image and the compression rate 220 of the image. In general, an image made of a smaller number of pixels cannot be compressed at a higher compression rate. Therefore, it is preferable that a higher compression rate (bits/pel) be set. No shooting information in the associated information is changed.

Figure 9:
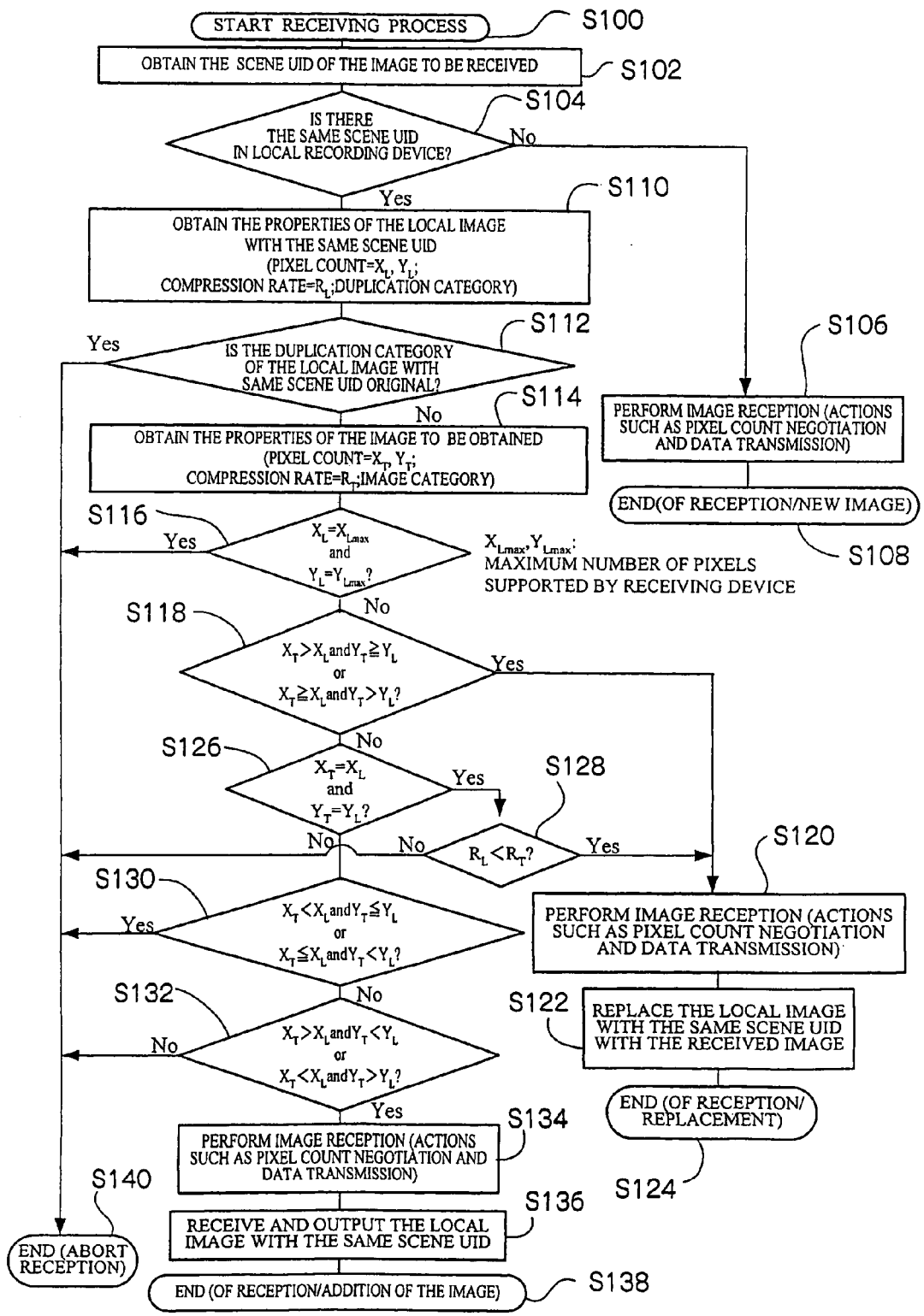
FIG. 9 shows a flowchart of an image management process for receiving an image in an electronic device.

FIG. 9 shows a flowchart of an image management process performed when an image is received by an electronic device.

When an electronic device such as an electronic camera 10, PDA 30, mobile phone 40, or personal computer 80 obtains an image from another communication apparatus through a communication device, or obtains an image from a recording device and provides it to another communication apparatus through a communication device or provides it to a recording device, a process performed in the information processing device of the electronic device is branched to a process routine at step S100 of "Start receiving process" shown in FIG. 9. Then, the process performed by the information processing device proceeds to step S102 ("Obtain the scene UID of the image to be received").

At step S102, the information processing device provides an instruction for obtaining the scene UID (an identification such as an original image identification 16) and image properties of the image through a communication device on a recording device. When the scene UID and image properties of the image are obtained, the process proceeds to step S104 ("Is there the same scene UID in local recording device?").

In a recording device (local recording device) in the electronic device, images are associated and recorded with their scene UID (image identification) and image properties such as information on the number of pixels of the images, compression rates, information about whether they are compressed or not, the amount of information contained in images after RGB or YCC sampling and the amount of image data.

At step S104, the information processing device determines whether the same scene UID as the scene UID obtained at step S102 is recorded in the recording device. If it determines that the same scene UID as the one obtained at step S102 is not recorded in the recording device, the process proceeds to step S106 "Perform image reception (actions such as pixel count negotiation and data transmission)", where the image transmission is started. After the image is obtained, the process proceeds to the next step, S108 "End (of reception/new image)," then the image is provided to the recording device or the other communication apparatus as a new image.

On the other hand, if it is determined at step S104 that the same scene UID as the one obtained at step S102 is recorded in the recording device, the process performed by the information processing device proceeds to step S110 "Obtain properties (the number of pixels=$X_L$, $Y_L$; compression rate=$R_L$; duplication category) of the local image with the same scene UID."

At step S110, the properties of the image associated and recorded from the recording device, etc. with the scene UID identical to the received scene UID on a local recording device beforehand are obtained. The horizontal and vertical pixel counts obtained from the recording device are represented by $X_L$ and $Y_L$ and the compression rate obtained is represented by $R_L$. The duplication category is also obtained.

At step S112 "Is the duplication category of the local image with same scene UID original?", the information processing device determines whether the duplication category obtained from the recording device is "Original" or not.

If the duplication category obtained from the recording device is "Original" (the original image), the image is not obtained because it is impossible that the new image contains more information than the original image. Then, the process proceeds to step S140 "End (abort reception)."

On the other hand, if the duplication category obtained is not "Original," the process proceeds to step S114 "Obtain the properties of the image to be used for reception (pixel count=$X_T$, $Y_T$; compression rate=$R_T$; duplication category)", where the properties of the image are obtained from the other communication apparatus over communication device or from the recording device. The horizontal and vertical pixel counts of the image to be newly obtained are represented by $X_T$ and $Y_T$ and the compression rate is represented by $R_T$. The duplication category is also obtained.

At step S116 "$X_L=X_{Lmax}$ and $Y_L=Y_{Lmax}$?," it is determined whether the pixel counts $X_L$ and $Y_L$ of the image recorded in the recording device are equal to the maximum pixel counts $X_{Lmax}$ and $Y_{Lmax}$ that can be handled by this electronic device.

If the information processing device determines that the pixel counts $X_L$ and $Y_L$ of the image recorded in the recording device are equal to the maximum values $X_{Lmax}$ and $Y_{Lmax}$ that can be handled by the electronic device, it considers that there is no need to receive the image consisting of the number of pixels equal to or less than the number of pixels of the image recorded in the recording device, which contains the maximum number of pixels supported by this electronic device. Thus, the process proceeds to step S140 and ends.

On the other hand, if the information processing device determines at step S116 that the pixel counts $X_L$ and $Y_L$ of the image recorded in the recording device are not equal to the maximum pixels counts $X_{Lmax}$ and $Y_{Lmax}$ that can be handled by this electronic device, the process proceeds to step S118 "$X_T>X_L$ and $Y_T \geq Y_L$ or $X_T \geq X_L$ and $Y_T>Y_L$?" because the image having a quality higher than that of the image recorded in the recording device can be obtained.

If at step S118 the information processing device determines that the condition is met, the process branches to step S120 "Perform image reception (actions such as pixel count negotiation and data transmission)," where image data transmission is started. After the image is obtained, the process proceeds to step S122 "Replace the local image with the same scene UID with the received image," where the image is obtained and recorded in the recording device. The image (consisting of the number of pixels less than that of the obtained image) recorded in the recording device that has the same identification is deleted. After the completion of the image replacement at step S122, the process proceeds to step S124 "End (of reception/replacement)".

On the other hand, if the information processing device determined that the condition is not met, the process proceeds to determination at step S126 "$X_T=X_L$ and $Y_T=Y_L$?" If the information processing device determined at step S126 that the condition is met, the process branches to step S1128 "$R_L<R_T$?", where the image category of the image to be obtained from the other communication apparatus through the communication device is compared with the image category of the image recorded in the recording device.

If it is determined at step S128 that the condition "$R_L<R_T$" is met, the process branches to step S120, where the image is obtained. If it determines that the condition "$R_L<R_T$" is not met, the process proceeds to step S140, where the image reception process is aborted.

On the other hand, if the information processing device determines at step S126 that the condition is not met, the process proceeds to step S130 "$X_T<X_L$ and $Y_T \geq Y_L$ or $X_T \geq X_L$ and $Y_T<T_L$?"

If the information processing device determines at step S130 that the condition is met, the process proceeds to step S140, where the image reception process is aborted.

On the other hand, if the information processing device determines at step S130 that the condition is not met, the process proceeds to determination in step S132 "$X_T>X_L$ and $Y_T<Y_L$ or $X_T<X_L$ and $Y_T>Y_L$?."

If the information processing device determines at step S132 that the condition is met, the process branches to step S134 "Perform image reception (actions such as pixel count negotiation and data transmission)," where data transmission is started. After the image is obtained, the process proceeds to step S136 "Receive and output the local image with the same scene UID," where the image is obtained and provided to the recording device. The image that is recorded in the recording device and has the same identification is retained without being deleted. After the completion of the image replacement at step S136, the process proceeds to step S138 "End (of reception/addition of the image)."

On the other hand, if the information processing device determines at step S132 that the condition is not met, the process proceeds to step S140, where the image reception process is aborted.

While the embodiment has been described in which the pixel count and compression rate in the image properties are used to determine whether or not the image should be obtained or outputted, the present invention is not limited to this. The determination may be made based on information about whether the image is compressed or not, the amount of sampled information, or the amount of image data.

Configuring an image management apparatus, such as a personal computer 80, as described above can automatically abort a process requested by a user for sending an image of 120×120 pixels, for example, from a mobile phone 40 to the personal computer 80, in which a corresponding image of 640×480 pixels outputted from a PDA 30 is already recorded in its recording device 886, thereby avoiding the replacement of the 640×480-pixel image recorded in the recording device 886 with the image having a resolution of as low as 120×120 and a smaller amount of information.

If the user subsequently provides a request for providing their original version consisting of 1280×960 pixels from an electronic camera 10 to the personal computer 80, the original image of 1280×960 is sent from the electronic camera 10 to the personal computer 80 and recorded in the recording device 886 in place of the image of 640×480 pixels recorded in the recording device 886 of the personal computer 80. Thus, the problem that a number of images of the same scene are unnecessarily recorded in the recording device 886 can be avoided.

Alternatively, the apparatus may be configured so as to always perform image transfer requested by the user and, if it is requested to perform image transfer that would be aborted in the above-described configuration, to subordinate a transferred image to a recorded image (manage as a group).

As described above, an image management apparatus according to the present invention includes a recording device for associating and recording an image with the identification and image property of the image, an obtaining device for obtaining the image and the identification and image property of the image from a communication apparatus over communication device or from a recording device, a comparison device for reading an image property recorded in the recording device based on the identification of the image obtained by the obtaining device and comparing them with the obtained image property, and an output device for outputting the obtained image to a communication apparatus over a communication device or to a recording device if it is determined as a result of the comparison by the comparison device that the obtained image property provides a larger amount of information. Thus, if the amount of information in the image being obtained is larger than that of the recorded image and closer to its original image, the image is obtained to be sent to the communication device or recorded on a recording medium.

According to another aspect of the present invention, the image management apparatus comprises an obtaining device for obtaining an image and the identification of an image from a communication apparatus over a communication device or from a recording device, an image conversion device for applying image conversion to the obtained image, an identification assigning device for retaining the identification of the image obtained by the obtaining device and assigning it to the converted image, and an output device for outputting the image converted by the image conversion device and the identification of the image assigned to the image by the identification assigning device to a communication apparatus over communication device or a recording device. Thus, images can be managed without changing the identifications of the image assigned to the images even if they are converted.

Furthermore, unnecessary duplication of images of the same scene is avoided and therefore redundancy of images is eliminated. In addition, an image having a larger amount of information (a higher specification) of the image to be received and local images is selected and replaces a lower-specification one, the best image is kept recorded.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image management apparatus which prerecords a first image and is capable of obtaining a second image from a communication apparatus through a first communication link or from a first recording medium and outputting the second image to another communication apparatus through a second communication link or to a second recording medium, the image management apparatus comprising:
   a recording device which associates and prerecords the first image with an identification of the image and an image property of the image, the image property including information on a number of pixels, a compression rate of the image, information indicating whether the image is compressed or not, an amount related to image quality, information on proximity to original image data, an amount of data available at receiving device, or an amount of information contained in the image after RGB or YCC sampling is applied to the image;
   an obtaining device for obtaining the second image and the identification and the image property of the second image from the communication apparatus through the first communication link or the first recording medium;
   a comparison device which reads the image property of the prerecorded image recorded in the recording device based on a same identification of the second image obtained by the obtaining device to compare the read image property with the obtained property; and
   an output device which outputs the obtained second image to another communication apparatus through the second communication link or to the second recording medium if it is determined as a result of the comparison by the comparison device that the obtained second image property indicates a larger number of pixels, a lower compression rate, a non-compressed image, or a larger amount of sampled information.

2. The image management apparatus according to claim 1, wherein the output device outputs the obtained second image to the recording medium and deletes the prerecorded image associated and recorded in the recording medium having the same identification as the identification of the obtained second image to be output when outputting the obtained second image to the recording medium.

3. The image management apparatus according to claim 1, wherein the output device outputs the obtained second image to the recording medium and, if it is determined as the result of the comparison by the comparison device that the obtained second image property indicates a smaller number of pixels, a higher compression rate, a compressed image, or a smaller amount of sampled information, outputs the obtained second image to the another communication apparatus through the second communication link or to the second recording medium and retains the prerecorded first image associated and recorded with the same identification as the identification of the outputted obtained second image.

4. An image management apparatus which obtains an image from a communication apparatus through a communication link or from a first recording medium and outputs the image to another communication apparatus through another communication link or to a second recording medium, the image management apparatus comprising:

an obtaining device which obtains an the image and an identification of the image from the communication apparatus through the communication link or from the first recording medium;

an image conversion device which applies, to the obtained image, image conversion including pixel count change, compression rate change, image compression, image sampling criterion change such as RGB or YCC, or aspect ratio change;

an identification assigning device which retains the identification of the image obtained by the obtaining device and assigns the same identification to the converted image after the image conversion is applied to the image; and an output device which outputs the image converted by the image conversion device and the identification of the image assigned to the image by the identification assigning device to the another communication apparatus through the second communication link or to the second recording medium.

5. The image management apparatus according to claim 4, wherein if a new image is generated or created by shooting a subject, combining a plurality of images, or trimming the length and width of an original image, the identification assigning device generates a unique identification and assigns the unique identification to the newly generated or created image, and the output device outputs the generated or created image and the identification of the image assigned to the image by the identification assigning device to the communication apparatus through the communication link or to the second recording medium.

6. An image management program running on an information processing device in an image management apparatus comprising a recording device which associates and prerecords a first image with an identification and image property of the first image, an obtaining device for obtaining a second image and the identification and image property of the second image, a comparison device which reads the image property of the prerecorded first image to compare the read image property with the obtained second image property, an output device for outputting the second image obtained based on a result of the comparison, and the information processing device being capable of controlling the recording device, obtaining device, comparison device, and output device, the image management program obtaining the second image from a communication apparatus through a first communication link or from a first recording medium and outputting the obtained second image to another communication apparatus through a second communication link or to a second recording medium, wherein the image management program causes the image processing device to provide the functions of:

the recording device which associates and prerecords the first image with the identification of the image and the image property of the image, the image property including information on a number of pixels and a compression rate of the image, information indicating whether the image is compressed or not, an amount related to image quality, information on proximity to original image data, an amount of data available at receiving device, or an amount of information contained in the image after RGB or YCC sampling is applied to the image;

the obtaining device which obtains the second image, the identification of the second image and the image property of the second image from the communication apparatus through the first communication link or the first recording medium;

the comparison device which reads the image property prerecorded based on the same identification of the second image obtained by the obtaining device to compare the read image property with the obtained property; and the output device which outputs the obtained second image to the another communication apparatus through the second communication link or to the a second recording medium if it is determined as the result of the comparison by the comparison device that the obtained second image property indicates a larger number of pixels, a lower compression rate, a non-compressed image, or a larger amount of sampled information.

7. An image management program running on an image processing device in an image management apparatus comprising an obtaining device which obtains an image and an identification of the image, an image conversion device which applies image conversion to the obtained image, an identification assigning device which retains the identification of the image and assigns the identification to the converted image after the image conversion is applied to the image, an output device which outputs the converted image and the identification of the image, and an information processing device which controls the obtaining device, image conversion device, identification assigning device, and output device, the image management program obtaining the image from a communication apparatus through a first communication link or from a first recording medium and outputting the image to another communication apparatus through a second communication link or to a second recording medium, wherein the image management program causes the image processing device to provide the functions of:

the obtaining device which obtains the image and the identification of the image from the communication apparatus through the first communication link or from the first recording medium;

the image conversion device which applies image conversion, the image conversion including pixel count change, compression rate change, image compression, image sampling criterion change such as RGB or YCC, or aspect ratio change to the obtained image;

the identification assigning device which retains the identification of the image obtained by the obtaining device and assigns the same identification to the converted image after the image conversion is applied to the image; and the output device which outputs the image converted by the image conversion device and the identification of the image assigned to the image by the identification assigning device to the another communication apparatus through the communication link or to the second recording medium.

8. An image management method for obtaining an image from a communication apparatus through a first communication link or from a first recording medium and outputting the image to another communication apparatus through a second communication link or to a second recording medium, the method being performed in an information processing device in an image management apparatus comprising a recording device which associates and prerecords an image with an identification and image property of the image, an obtaining device which obtains a second image and an identification and image property of the second image, a comparison device which reads the image property prerecorded to compare the read image property with the obtained image property, and an output device which outputs the second image obtained based on a result of the comparison, the method comprising the steps of:

associating and recording the image with the identification of the image and the image property of the image, the image property including information on a number of pixels and a compression rate of the image, information indicating whether the image is compressed or not, an amount related to image quality, information on proximity to original image data, an amount of data available at receiving device, or an amount of information contained in the image after RGB or YCC sampling is applied to the image;

obtaining by the obtaining device the second image, the identification of the second image and the image property of the second image from the communication apparatus through the first communication link or the first recording medium;

reading by the comparison device the image property prerecorded based on a same identification of the second image obtained by the obtaining device to compare the read image property with the obtained property; and outputting the obtained second image to the another communication apparatus through the second communication link or to the second recording medium by the output device if it is determined as the result of the comparison by the comparison device that the obtained image property indicates a larger number of pixels, a lower compression rate, a non-compressed image, or a larger amount of sampled information.

9. An image management method for obtaining an image from a communication apparatus through a first communication link or from a first recording medium and outputting the image to another communication apparatus through a second communication link or to a second recording medium, the method being performed in an information processing device in an image management apparatus comprising an obtaining device which obtains the image and an identification of the image, an image conversion device which applies image conversion to the obtained image, an identification assigning device which retains the identification of the image and assigns the same identification to the converted image after the image conversion is applied to the image, and an output device which outputs the converted image and the identification of the image, the method comprising the steps of:

obtaining by the obtaining device the image and the identification of the image from the communication apparatus through the first communication link or from a first recording medium;

applying by the image conversion device image conversion including pixel count change, compression rate change, image compression, image sampling criterion change such as RGB or YCC, or aspect ratio change to the obtained image;

retaining by the identification assigning device the identification of the image obtained by the obtaining device and assigning the same identification to the converted image after the image conversion is applied to the image; and outputting by the output device the image converted by the image conversion device and the identification assigned to the image by the identification assigning device to another communication apparatus through the second communication link or to the second recording medium.

\* \* \* \* \*